United States Patent [19]

Arvidsson

[11] Patent Number: 4,915,510
[45] Date of Patent: Apr. 10, 1990

[54] HYDROSTATIC THRUST BEARING SYSTEM

[75] Inventor: Thomas Arvidsson, Linköping, Sweden

[73] Assignee: Cellwood Machinery AB, Nässjö, Sweden

[21] Appl. No.: 354,434

[22] PCT Filed: Nov. 9, 1987

[86] PCT No.: PCT/SE87/00524
§ 371 Date: May 1, 1989
§ 102(e) Date: May 1, 1989

[87] PCT Pub. No.: WO88/03611
PCT Pub. Date: May 19, 1988

[30] Foreign Application Priority Data
Nov. 12, 1986 [SE] Sweden .................. 8604848

[51] Int. Cl.4 .......................... F16C 32/06
[52] U.S. Cl. ...................... 384/99; 384/121; 384/448
[58] Field of Search .......... 384/99, 121, 448, 118, 384/369, 12, 303

[56] References Cited

U.S. PATENT DOCUMENTS

| 4,239,300 | 12/1980 | Adler . | |
|---|---|---|---|
| 4,643,592 | 2/1987 | Lewis et al. | 384/99 |
| 4,652,148 | 3/1987 | Olasz | 384/99 |
| 4,696,585 | 9/1987 | Swearingen | 384/448 |

FOREIGN PATENT DOCUMENTS

| 2357881 | 5/1975 | Fed. Rep. of Germany . |
| 433767 | 3/1983 | Sweden . |

Primary Examiner—Lenard A. Footland
Attorney, Agent, or Firm—Frishauf, Holtz, Goodman & Woodward

[57] ABSTRACT

A hydrostatic thrust bearing system characterized in that the hydrostatic bearings are axially movable and are held urged against the pressure plate in mutually opposite directions by hydraulic pressure created in a chamber associated with a respective bearing; and in that a servo valve is provided for co-action with an axial-position sensor for controlling the amount of hydraulic fluid fed to a respective chamber and also to control the hydraulic pressure acting on a respective bearing such as to take-up axial loads which vary in magnitude and direction.

10 Claims, 2 Drawing Sheets

4,915,510

HYDROSTATIC THRUST BEARING SYSTEM

FIELD OF INVENTION

The present invention relates to a hydrostatic thrust bearing system for a radially journalled axle or shaft provided with a pressure plate or collar, the thrust bearing system having an external configuration which enables the system to be mounted around the rotatable axle and including a hydrostatic thrust bearing on each side of the pressure plate, and in which system each of the thrust bearings incorporates at least one oil pocket to which hydraulic fluid is fed from a hydraulic fluid source, preferably a constant flow pump.

STATE OF THE ART

Thrust bearings of this kind intended for taking up large axial forces are to be found in many technical fields.

One technical field in which such thrust bearings are used is found in the fibre beating mills of the paper industry, in which mills axial forces in the order of five tones or more can be generated in the beating process, even in mills of modest dimensions, and which also vary during the beating or pulping process.

For the purpose of maintaining a beating gap of predetermined width, the journalling problems are normally solved by arranging the radial bearings of the shaft or axle in a bearing box or a bearing package and then adjusting the whole of the bearing package axially with the aid of hydraulic systems in dependence on the axial loads that occur, in order to adjust the beating gap.

There is normally used in this regard a servo value which is in direct contact with the bearing package. The servo valve ensures that the beating gap can be adjusted smoothly and continuously to a tolerance of 1/100 mm while the beater is in operation, despite large variations in axial loads.

Also known to the art is a combined hydrostatic/hydrodynamic bearing system for beating apparatus in paper manufacturing mills, in which the two end surfaces of a collar provided on a shaft or axle constitute piston surfaces which work in a surrounding pressure chamber in a manner to enable the collar, and therewith the shaft, to be moved axially in the pressure chamber (see Wo 86/01434-Sunds Defibrator).

Variations on the axial load on the shaft are counteracted by means of compensatory fluid pressure on the end surfaces of the piston, such as to maintain a beater gap of predetermined width.

This publication, however, does not teach a hydrostatic bearing of the kind to which the present invention relates, i.e. a hydrostatic bearing which includes an oil pocket which exhibits an inner and an outer two ends annular sealing gap and has a constant leakage flow. In the case of this known bearing system, the radial gap between the chambers defined by the piston always has a constant width.

Various further types of hydrostatic bearings are known to the art. One essential characteristic of a hydrostatic bearing is that it is dependent on the supply of fluid from an external pressure source. This external pressure source ensures that metallic contact is avoided under all circumstances when the fluid supplied is evacuated through leakage or sealing gaps located in peripheral parts of the bearing.

Prior art hydrostatic bearings include so-called ring chamber bearings which are located opposite one another and which are mounted with a pre-set gap width. Consequently, a great deal of precision is required when fitting the bearings.

DE-A-2 357 881 (Mannesmann-Meer AG) teaches a hydrodynamic thrust bearing provided with a flanged pressure plate against which a plurality of slide shoes are urged by means of hydraulic pistons. These slide shoes move over an oil film having a thickness of between 0.008 and 0.012 mm. This oil film is created in a manner similar to that employed in other well known slide bearings, i.e. the film is built up between the two bearing surfaces as a result of the relative movement therebetween. The thickness of the oil film is therewith contingent on the speed at which the shaft or axle rotates and has no lubricating or carrying function when the axle is stationary.

In the case of these known hydrodynamic bearing systems the separate hydraulic pistons are intended to take up the load uniformly around the rotationally symmetrical pressure plate, so as to equalize pressure surges and to provide a "play free" arrangement.

Other types of known hydrostatic thrust bearing systems which relate to the bearing system of the present invention, i.e. bearing systems which include oil pockets, e.g. annular hydraulic chambers, are found described and illustrated in SE-B-8105404-1 (Svenska Rotormaskiner), F16C21/00, DE-A-23 57 881 (Mannesmann-Meer) and DE-A-24 48 785 (Kugelfischer Georg Schäfer).

OBJECTS OF INVENTION

An object of the present invention is to provide a simplified hydrostatic thrust bearing system of the aforesaid kind which will afford improved precision in the bearing under conditions of radically varying axial loads, despite the simplified construction of the bearing system, and thereby enable the shaft or axle to be rotated at higher speeds.

SUMMARY OF THE INVENTION

A hydrostatic thrust bearing system according to the invention which fulfils this and other objects is of the kind set forth in the introduction and is mainly characterized in that the hydrostatic bearings are axially movable and are held urged against the pressure plate in mutually opposite directions by means of hydraulic pressure created in a chamber associated with a respective bearing; and in that means, e.g. a servo valve, is provided for co-action with an axle-position sensing means for controlling the amount of hydraulic fluid fed to a respective chamber and also to control the hydraulic pressure acting on a respective bearing such as to take-up axle loads which vary in magnitude and direction.

The hydrostatic bearing according to the invention is axially movable and is held urged against the pressure plate by means of hydraulic pressure acting in the chambers of respective bearings in mutually opposite directions. Control means, e.g. in the form of a servo valve, is intended to co-act with a sensor which senses the axial position of the axle or shaft, such as to control the amount of hydraulic fluid which is supplied to respective chambers and to control the hydraulic pressure acting on respective bearings, thereby taking up axle loads which vary in magnitude and direction.

With a bearing system constructed in accordance with the invention, the axial position of the axle is adjusted smoothly and continuously irrespective of the load on the axle and the speed at which it rotates.

As opposed to known bearings, e.g. the bearing system taught by the above mentioned German published specification 2 357 881, which do not afford smooth, continuous adjustment of the axle or shaft in response to varying axial loads, but merely afford a limit position function, a bearing system constructed in accordance with the invention enables pressure and the fluid supplied to the two hydraulic chambers to be distributed in a smooth and continuous fashion.

There is preferably used to this end a hydraulic servo valve, e.g. a copying valve, which will distribute pressure and fluid quantity continuously and smoothly between the two chambers.

Because the invention bearing system has two axially movable hydrostatic bearings which are urged hydraulically against the pressure plate in mutually opposite directions, it is not necessary to move the entire bearing box or bearing package axially, thereby enabling the bearings to be of simpler construction and improving the reliability of the bearing.

The width of the generated fluid-throttling gap is a function of the load, i.e. the fluid pressure in accordance with a known formula, such that a greater fluid flow will result in a larger gap, while a greater load results in a higher fluid pressure, which in turn results in a smaller gap. A higher viscosity of the fluid will also result in an increase in gap width.

The invention thus insures that the gap width of the two leakage or sealing gaps will be adjusted automatically, i.e. the gap is self-adjusting.

A preferred embodiment of the invention in which each hydraulic fluid source produces a constant hydraulic flow which generates a leakage or sealing gap which departs from respective oil pockets and which is operative in creating a throttling effect and thereby pressurizing the fluid, is characterized in that said control means, e.g. the servo valve, when the hydrostatic bearings are subjected to varying axial loads, is intended to maintain a hydraulic pressure which varies proportionally to the load, such that the leakage or sealing gaps obtain a self-adjusting gap width which varies in inverse proportion to the hydraulic pressure.

The two thrust bearings thus work in the manner of axially acting hydraulic pistons which, in accordance with a further embodiment of the invention, are each guided radially in a respective cylinder e.g. through the intermediary of a Teflon band placed around the inner peripheral surface between sealing rings. This will avoid metal-on-metal contact between the bearings and the inner surfaces of the cylinders.

Due to the rotational symmetry of the bearings and the cylinder, it is normally sufficient to guide the bearings along one of the surfaces.

The two hydrostatic bearings may have oil pockets of varying configuration and in varying numbers. It is preferred, however, that the bearings have an outer configuration which will enable the bearings to be fitted around the rotatable shaft.

In practice, the hydrostatic bearings will have a so-called ring-chamber configuration, i.e. the oil pocket is annular and includes radially inner and outer annular leakage or sealing gap.

The supply of hydraulic medium, e.g. oil, to the hydrostatic bearings is preferably effected with the aid of constant flow pumps, although other more exclusive means may be used to this end.

BRIEF DESCRIPTION OF THE DRAWINGS

The invention will now be described in more detail with reference to exemplifying embodiments thereof and also with reference to the accompanying schematic drawing.

DESCRIPTION OF PREFERRED EMBODIMENTS

Figure 1:
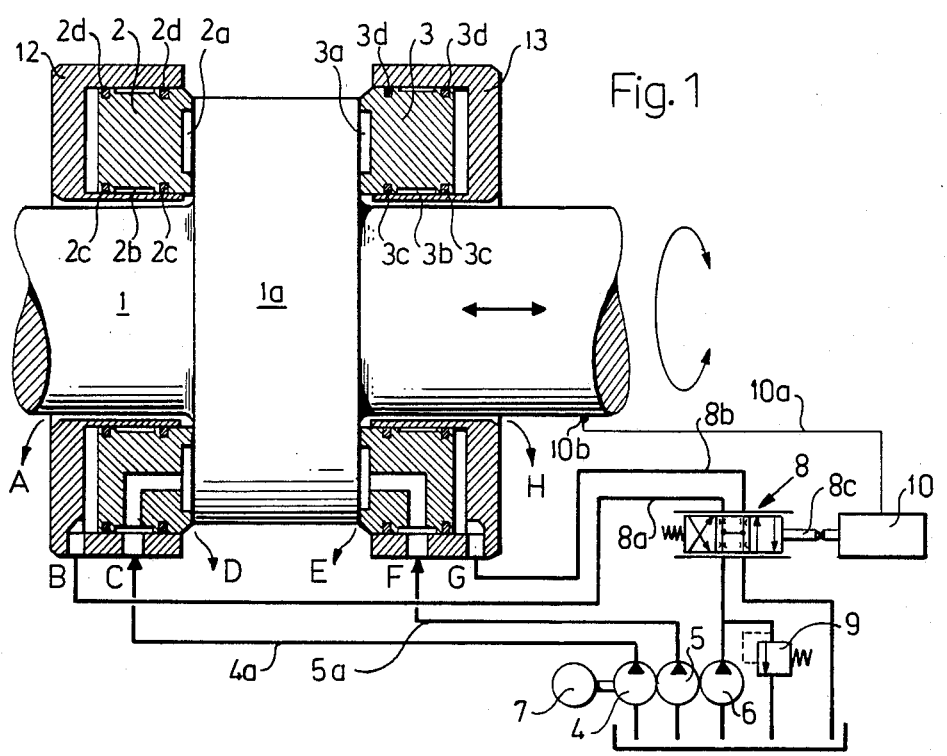
FIG. 1 is a vertical section through part of an axle which is provided with a pressure plate and which incorporates the inventive hydrostatic thrust bearing system, said figure illustrating the principle in accordance with which the inventive system functions.

In FIG. 1 the reference 1 designates an axle which is assumed to be subjected to axial loads of varying magnitude and direction. In order to enable these loads to be taken up, a ring or oil bearing 2 and 3 is held urged hydrostatically against a respective side surface of the pressure plate or collar 1a, these bearings 2, 3 having an external configuration which enables them to be mounted around the axle.

Each bearing is provided with a peripherally extending oil pocket 2a, 3a to which oil is supplied from a respective constant flow pump 4 and 5 driven by a motor 7. Inner and outer ring leakage or sealing gaps extend from the oil pockets 2a, 3a. The oil leaking from the pocket 2a through the inner gap is conducted parallel with and circumferentially around the axle 1, and departs from the bearing in a flow A. The flow of oil leaking through the outer leakage gap is referenced D.

Corresponding leakage flows from the oil pocket 3a through respective inner and outer leakage gaps are referenced H and E. The constant flow pumps 4, 5 which supply the oil pockets 2a, 3a with oil are referenced 4 and 5, respectively. The pressure lines 4a and 5a extending from respective pumps 4, 5 are connected to the ring oil bearing at C and F, respectively.

Each of the bearings 2, 3 is arranged for axial movement in a respective cylinder 12, 13 and is also guided radially therein. In the illustrated embodiment this radial guidance of the bearings is achieved by means of a respective Teflon band 2b, 3b located on the inner peripheral surface between sealing rings 2c and 3c. Further sealing rings 2d, 3d are provided on the outer peripheral surface of respective bearings.

The bearings 2, 3 in respective cylinders 12, 13 are subjected to hydraulic pressures which, when the axial load varies or changes, results in automatic adjustment, or self-adjustment, of the width of the leakage or sealing gaps extending from respective oil pockets 2a, 3a.

Each of the bearings 2, 3 therewith functions as an axially working hydraulic piston, which in the illustrated embodiment is controlled by a servo valve 8. This valve is of the copying-valve kind and has a slide which is in physical contact with the axle 1 via separate means, such that the pressure in the hydraulic cylinders 12, 13 is adjusted in response to the slightest change in the axial position of the axle 1.

The copying valve 8 is maintained under constant oil pressure, e.g. a pressure of 70 bars, by means of a pump 6. The valve pressure is maintained constant by means of a pressure limiting valve 9.

The copying valve 8 is of a conventional kind and is intended to insure that the space behind respective bearings 2, 3 in the cylinders 12, 13 stands under the prevailing pressure, via lines 8a and 9a with connections B and G, respectively.

In the illustrated embodiment the axial position of the axle 1 is adjusted by changing the setting of the valve 8 directly, with the aid of a remote-controlled stepping motor 10. Although not shown, an adjustment screw may be used as an alternative to the motor 10. The stepping motor 10 operates in co-action with a sensor 10b, through a line 10a, and receives from the sensor information concerning axial displacement movements of the axle.

When the sensor 10b detects axial movement of the axle 1, for example movement of the axle to the left in the drawing, a corresponding signal is sent to the stepping motor 10 which in response thereto displaces the slide 8c of the copying valve 8 so as to adjust the valve to one of the three symbolically illustrated valve positions. Oil under pressure is therewith passed from the pump 6, through the line 8a and the connection B, to the chamber of the cylinder 12 accommodating the bearing 2, whereupon the bearing will move the axle to the right in the drawing, i.e. a self-adjusting displacement operation is carried out, which is registered by the sensor 10b co-acting with the stepping motor 10, which in response to the signal sent by the sensor 10b switches the valve to the valve position corresponding to the central position of the three symbolically illustrated valve positions.

Should the axle 1 be moved to the right in the figure, the stepping motor will instead switch the valve 8 to a valve position corresponding to the left-hand valve position of the illustrated valve positions. This will then result in an increase in pressure in the chamber of the right cylinder 13.

Figure 2:
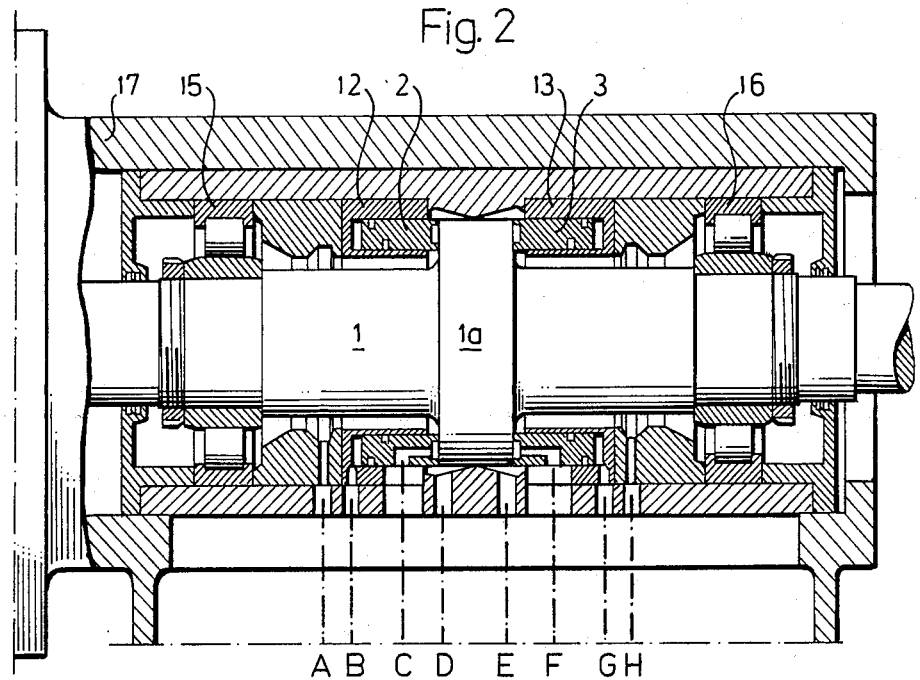
FIG. 2 is a vertical section of a working axle which incorporates the inventive bearing system and which forms part of a working machine, said figure also showing radial bearings on respective sides of the thrust bearing system.

FIG. 2 illustrates a working example in which the axle 1 forms part of a mill for beating fibre stock in the paper industry. Such beating mill axles are subjected to large axial loads, e.g. loads in the order of 5 tons or more, and may have a diameter in the region of 300 mm in the vicinity of the bearings 2, 3.

Arranged on each side of respective thrust bearings 2, 3 are stationary radial bearings 15, 16, which in the illustrated embodiment comprise conventional cylindrical roller bearings. Bearings of this kind permit axial displacement of the axle 1 through a distance of ±10 mm.

The thrust bearing system of the FIG. 2 embodiment is in principle of similar construction to the system of the FIG. 1 embodiment.

FIG. 2 also illustrates the four connections B, C, F and G for oil under pressure, these connections being identified by the same references. The leakage flows A, D, E and H departing from the inner and outer leakage or sealing gaps of respective bearings are received and conducted away via connections which are identified by references corresponding to those used in FIG. 1.

The axle 1 and associated radial and thrust bearings 15, 16 and 2, 3 are housed in a housing or casing 17.

The bearing system of FIG. 2 provides a high degree of precision, despite rotation of the axle and the varying axial loads to which it is subjected. In comparison with conventional axial roller bearings of corresponding size, which can be normally driven at a speed of at most 800/1000 rpm, with forced lubrication, possibly up to 1500 rpm, a bearing constructed in accordance with the invention enables the axle or shaft to be driven at twice the speed, i.e. at a speed of about 3000 rpm.

The improved position afforded by the inventive bearing system is mainly due to the aforedescribed direct servo steering of the hydrostatic bearings, i.e. it is not necessary to steer the entire bearing housing or bearing box, such bearing housings or bearing boxes of conventional systems normally incorporating radial bearings.

It follows from what has been stated above that the hydraulic system from a position of hydraulic equilibrium in which there is no axial thrust on the axle 1 shall continuously increase or decrease, respectively, the pressures in the opposite hydraulic chambers when an outer axial thrust is developed in any direction. Further, the axial position of the axle shall be changed by varying the volumes of hydraulic fluid in the two opposite chambers.

A device having this capability is a hydraulic servo device of the general kind described above with reference to valve 8, stepping motor 10 and sensor 10b.

The said valve 8 is arranged when feeded with a constant system pressure P, at the position of hydraulic equilibrium, to deliver half the pressure, i.e. P/2 to each connection or port B and G, respectively.

By offsetting the slide of the valve the pressures in B and G will increase or decrease, respectively, in proportion to the displacement of the slide.

The slide is, as shown, via stepping motor 10 and sensor 10b (or any other suitable means, for instance an electric device) re-coupled to the axle 1. Then a displacement of the axle will be transformed to a proportional pressure increase/decrease in the respective chambers.

In addition, the preset position of equilibrium of the servo device may by outside influence be changed so that a corresponding permanent displacement of the axle 1 is accomplished. This will take place when valve 8 permits a bigger or smaller, respectively, volume of hydraulic fluid to be present in the two opposite hydraulic chambers.

In practice this can be obtained by means of a manually operable set-screw or a remote-controlled step motor.

In a practical example the system pressure is 70 bar. The hydraulic chambers in communication with connections or ports B and G, respectively, have each a pressure-exposed area of 1000 cm$^2$.

In unloaded condition the pressure in each chamber will be P/2=35 bar resulting in a bearing thrust of 35·1000=35 tons.

If then an axial thrust is developed the pressure will decrease/increase in the opposite chambers which means that the thrust on one of the bearings will decrease as much as it is increased on the other one.

This can be illustrated in a diagram where pressure and resulting bearing thrust of each chamber is given as a function of the outer generated axial thrust.

There are, however, in practice other ways of controlling said process. Thus, by using a micro-processor it is for instance possible to simulate the function of the servo valve.

A micro-processor will then be feeded with data giving information on the axial position of the main axle—several times per second—and this information is processed into one or more output signals.

These signals may then by used via hydraulic throttle valves to individually control pressures and fluid volumes in respective chambers. A device of this kind will also fall within the scope of the attached claims.

Figure 3:
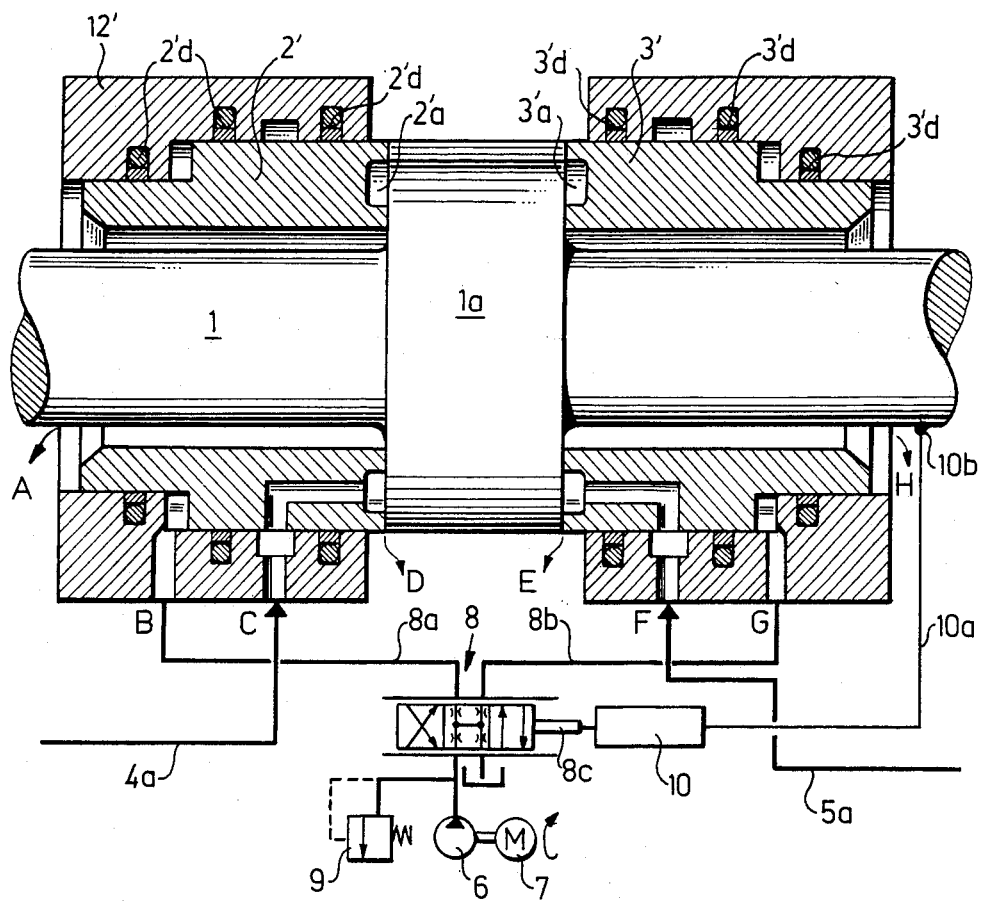
FIG. 3 is a vertical section through a somewhat modified embodiment. In the Figures like components have been identified with like references.

In the FIG. 3 embodiment the servo steering system is of the general kind described above with reference to FIG. 1. Corresponding somewhat different parts have been provided with a prime sign (').

The main difference relative to the previously described embodiments resides in that each bearing cylinder 12', 13' does not completely surround a piston-like thrust bearing such as the ones denoted 2 and 3, respectively, in FIGS. 1 and 2.

Instead each thrust bearing 2', 3' has a stepwise outer peripheral configuration, and the cylinders 12', 13' a corresponding mating stepwise inner peripheral configuration to coact with each bearing. Only one stepwise surface of each cylinder 12', 13' and thrust bearing 2', 3', respectively, have then to be carefully machined.

The general function will be the same but the manufacture of the bearing shown in FIG. 3 is substantially simplified.

INDUSTRIAL APPLICATION

A number of important advantages are gained by the inventive combination of mutually opposing hydrostatic thrust bearings, hydraulic pressure contact of the bearings with the pressure plate, and the aforesaid smooth and continuous distribution of pressure and hydraulic fluid.

In addition to those particular advantages which are afforded when using a hydrostatic bearing system which enables loads acting in various direction to be taken up and which is insensitive to load and axle speed, and which enables the gap width to be adjusted automatically (self-adjusting), the bearing system according to the invention also enables the axial position of the axle or shaft to be adjusted smoothly and continuously to a very high degree of accuracy, e.g. to an accuracy of 1/100 mm.

Other important advantages afforded by a hydrostatic thrust bearing system according to the invention are:
 the possibility of driving the shaft or axle at considerably higher speeds than with known bearing systems,
 greater flexibility with regard to the loads that can be taken up,
 longer useful life,
 higher setting precision,
 simpler and less expensive manufacture, and
 reduced sensitivity to vibrations.

A bearing system according to the invention lends itself to further development and can be used in many different technical fields. The two hydrostatic bearings may be provided with any desired number of oil pockets, which may have any desired configuration. It will also be understood that the hydraulic medium used in the cylinders accommodating the hydrostatic bearings need not necessarily be oil and that any suitable hydraulic medium may be used.

I claim:

1. A hydrostatic thrust bearing system for a radially journalled axle or shaft (1) provided with a pressure plate or collar (1a), the thrust bearing system having an external configuration which enables the system to be mounted around the rotatable axle (1) and including a hydrostatic thrust bearing (2, 3; 2'a, 3'a) on each side of the pressure plate (1a), and in which system each of the thrust bearings incorporates at least one oil pocket (2a, 3a; 2'a, 3'a), to which hydraulic fluid is fed from a hydraulic fluid source, characterized in that the hydrostatic bearings (2, 3; 2', 3') are axially movable and are held urged against the pressure plate (1a) in mutually opposite directions by means of hydraulic pressure created in a chamber associated with a respective bearing; and in that means, is provided for coaction with an axial-position sensing means (10b) for controlling the amount of hydraulic fluid fed to a respective chamber and also to control the hydraulic pressure acting on a respective bearing such as to take-up axial loads which vary in magnitude and direction.

2. A system according to claim 1, in which each hydraulic fluid source (4, 5) produces a constant hydraulic flow which generates a leakage or sealing gap which departs from respective oil pockets (2a, 3a; 2'a, 3'a) and which is operative in creating a throttling effect and thereby pressurizing the fluid, characterized in that said control means, when the hydrostatic bearings (2, 3; 2', 3') are subjected to varying axial loads, is intended to maintain a hydraulic pressure which varies proportionally to the load, such that the leakage or sealing gaps obtain a self-adjusting gap width which varies in inverse proportion to the hydraulic pressure.

3. A system according to claim 1, characterized in that each thrust bearing (2, 3; 2', 3') is mounted for axial movement in the chamber of a respective hydraulic cylinder (12; 13), such that the hydraulic pressure acts against the end surface facing the oil pocket of the bearing.

4. A system according to claim 3, characterized in that each bearing is radially guided in respective cylinders (12, 13; 12', 13'), e.g. by means of a Teflon band (2b; 3b) located on the inner peripheral surface between sealing rings (2c, 3c).

5. A system according to claim 4, characterized in that each axial bearing (2, 3; 2', 3') is provided with peripherally extending outer sealing rings (2d, 3d; 2'd, 3'd) on each side of a peripheral, outer flared part of one channel to respective oil pockets (2a, 3a; 2'a, 3'a).

6. A system according to claim 1, characterized in that said control means includes a servo valve in the form of a copying valve (8) which has a slide (8c) that can be adjusted in dependence on the axial position of the axle, e.g. by means of a stepping motor 10.

7. A system according to claim 1, characterized in that the outer peripheral surface of each thrust bearing (2', 3') has a stepwise configuration coacting with a mating stepwise inner peripheral surface on each cylinder (12', 13').

8. A system according to claim 1, characterized in that the means for controlling the amount of hydraulic fluid fed to a respective chamber includes a microprocessor.

9. A system according to claim 1, wherein said hydraulic fluid source includes a constant flow pump (4, 5).

10. A system according to claim 1, wherein said means for controlling the amount of hydraulic fluid comprises a servo valve (8).

* * * * *